Figure 1:
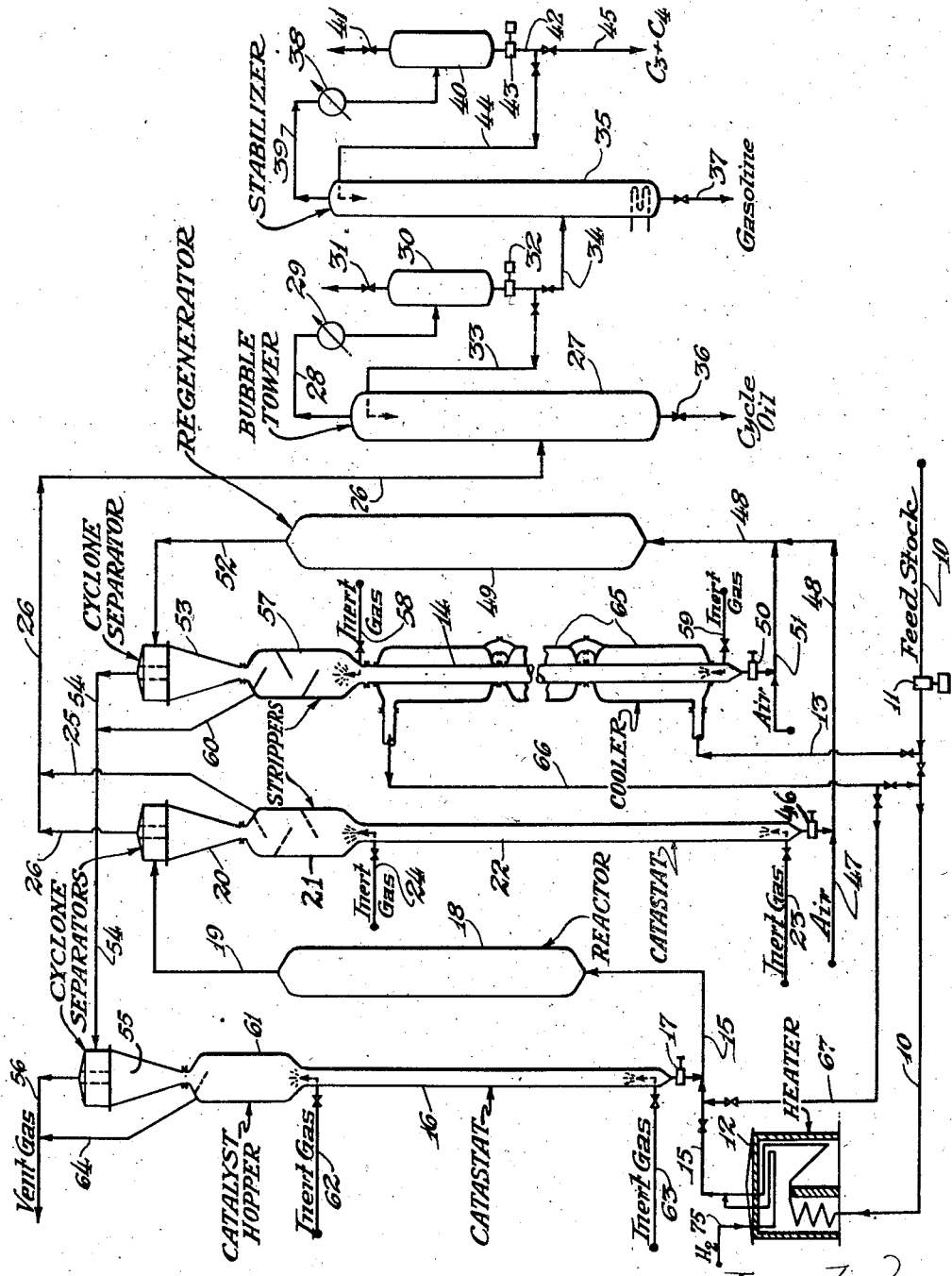

March 4, 1947.  M. H. ARVESON  2,416,729
CATALYST TECHNIQUE
Filed Dec. 31, 1940  2 Sheets-Sheet 1

Inventor:
Maurice H. Arveson
By Everett A. Johnson
Attorney.

March 4, 1947. M. H. ARVESON 2,416,729
CATALYST TECHNIQUE
Filed Dec. 31, 1940 2 Sheets-Sheet 2

Inventor:
Maurice H. Arveson
By Everett A. Johnson
Attorney

Patented Mar. 4, 1947

2,416,729

UNITED STATES PATENT OFFICE 2,416,729

CATALYST TECHNIQUE

Maurice H. Arveson, Flossmoor, Ill., assignor to Standard Oil Company, Chicago, Ill., a corporation of Indiana Application December 31, 1940, Serial No. 372,518

3 Claims. (Cl. 196—52)

This invention relates to the contacting of fluids with finely divided or powdered solid materials. More particularly the invention relates to catalyst technique wherein a fluid and a catalyst are introduced into a low velocity upflow contacting zone. The invention further relates to a process and apparatus for controlling the regeneration of catalysts. Finely divided and granular catalysts are commonly regenerated by contacting them at elevated temperatures with hot regeneration gases to remove carbonaceous and other deposits which lower the activity of the catalyst. This oxidation reaction is highly exothermic and the temperature tends to rise to levels injurious to the catalysts used. However, when the regeneration is carried out under proper conditions and excessive temperatures are avoided the catalyst can be recycled in the system almost indefinitely.

One object of the present invention is to control the temperature of regeneration of catalysts. Another object is to increase the life of a given catalyst. A still further object is to provide a method and means for utilizing the catalyst and heat more fully and to greater advantage than they have been in any previous catalytic system. Other objects, advantages and uses will become apparent as the description of the invention proceeds.

In practicing my invention I prefer to employ the so-called fluid catalyst system wherein a powdered, granular, or pelleted solid catalyst is suspended in reaction vapors during the conversion step, is then separated from conversion products, is next regenerated while suspended in a regeneration gas and is finally returned for effecting further reaction.

In a system of this kind, however, the concentration of the catalyst in the vapors in the reaction zone or the gases in the regenerator is not the same as the concentration at which the catalyst is introduced into the upflow chamber. Ordinarily the gases or vapors travel from a point near the bottom to a point near the top of the upflow zone. The concentration of catalyst in the reactor or regenerator is always higher and under certain conditions very substantially higher than would be calculated from the rate at which the catalyst is introduced. In fact, there are certain conditions of low velocity in the upflowing vapors or gases in the reactor or regenerator where the concentration of catalyst is nearly independent of the rate at which the catalyst is introduced. The direction of flow as well as the concentration of the solids may be independent of the direction of flow of the gases or vapors.

This effect is caused by the phenomenon of hindered settling, a term used to describe the increase in catalyst concentration in the upflow chamber resulting from the effect of gravity on the catalyst particles causing them to settle against the upflowing stream in the chamber. Complete settling and separation of the catalyst from the vapors, however, is prevented or hindered by the disturbing and buoying action of the upflowing stream.

The physical form of the catalyst in suspended catalyst conversion operations is usually a powder ranging in grade from 30 mesh to 300 mesh or finer, e. g., 400 mesh. Even coarser material has been employed and generally material falling within the range of 150 to 300 mesh is very satisfactory. Such a powder in compacted form has a density of about .7, i. e., it weighs about 40 to 45 pounds per cubic foot. When aerated at a gas velocity of about 0.03 to .2 feet per second, the catalyst becomes fluent and may have a density of about 20 to 40 pounds per cubic foot. At gas or vapor velocities of about .3 to 3 feet per second, preferably about 1 to 2 feet per second, the catalyst density may be about 10 to 20 pounds per cubic foot and I prefer to employ such catalyst density in my reaction and regeneration zones.

Various means have been proposed for pressuring the catalyst to be transferred to the upflow chamber. According to my invention, however, I prefer to use a powdered catalyst standpipe or "catastat" comprising an elongated storage or accumulation zone which can be aerated by the introduction of inert gas when necessary to avoid bridging of the catalyst. The catalyst behaves similar to a liquid and a head is produced by the column of catalyst. The catalyst is supplied to the "catastat" from above, the catalyst being separated from the gas-catalyst suspension by a suitable separator, for example a cyclone separator and passed by gravity through a stripper zone into the top of the "catastat." The introduction of the catalyst from the "catastat" to the upflow chamber can be controlled by a rotating valve, for example a star feeder, or other automatic feeding device. Likewise other means of pressuring the catalyst, for example a screw pump, can be used.

The objects of my invention are attained by cooling part of the regenerated catalyst separately accumulated, in a "catastat" for example, and recycling the cooled regenerated catalyst with the spent catalyst to control the temperature of regeneration. Such cooling of the catalyst can be achieved by a number of ways but I prefer to effect it by heat transfer between the hot regenerated catalyst and fresh feed. If desired an inert material of such particle size or density as to be readily removed from the regenerated gas-catalyst mixture leaving the regeneration zone can be cooled in a jacketed standpipe or "catastat" and circulated through the regeneration zone with the spent catalyst to control the temperature. Likewise part of the spent catalyst can be cooled and introduced into the regenerator along with the hot spent catalyst for temperature control.

The invention is applicable broadly to catalytic hydrocarbon conversions and is described below without reference to the particular conditions of the conversion operation. Two illustrative operations using my catalyst technique, i. e. catalytic cracking and catalytic dehydrogenation of normally gaseous hydrocarbons, are described. Although these examples refer to upflow low velocity reactors it is to be understood that spent catalyst from other sources, for example a moving bed operation, can be processed in accordance with my invention. Likewise other processes using solid particles for contacting, for example sorption media, can be regenerated or revived by my process.

Heavy hydrocarbons such as gas oil and vaporizable hydrocarbon oils in general can be converted into gasoline with yields of about 30 to 60% per pass by vaporizing the oils and contacting the vapors with finely divided solid catalytic materials in suspension at temperatures within the conversion range, usually of the order of between about 800 and 1000° F. Various catalysts can be used. It is preferred, however, to employ solid refractory cracking catalysts of the metal oxide type such as silica-alumina, silica-magnesia, alumina-zirconia, silica-zirconia-alumina, silica gel promoted with metal oxides adsorbed thereon, for example magnesia and/or alumina, acid treated bentonite and other acid treated clays, for example Super Filtrol, and other natural and synthetic catalysts of the solid metal oxide type.

A pressure of between 0 and 50 pounds per square inch gauge and a holding time, i. e. the average residence time of the catalyst within the reactor, of between about 0.5 and 60 minutes, for example about 5 minutes, can be used. A space velocity, i. e. volume of liquid oil per volume of catalyst per hour, of between about 1 and 20, for example a space velocity of about 5 can be used. The volume of catalyst is the volume occupied by the catalyst present in the reactor at any one instant measured at rest or in the pelleted condition. It is contemplated that high space velocities will be used with low holding times, these and other conditions being combined to give the desired degree of cracking.

Catalyst activity varies considerably and in general those catalysts which have very high initial activity and drop off in activity rapidly should be operated at short catalyst residence times, while other catalysts which drop off in activity only slightly can be operated at relatively long residence times. Dependent always upon the nature of the activity life curve of a catalyst, it can be said in general that at long residence times comparatively low space velocities can be used. The present method and apparatus is particularly adapted to operations at comparatively short residence times and high linear vapor velocities.

The process and apparatus described hereinafter can be adapted for the dehydrogenation of paraffin hydrocarbons by introducing hydrogen by line 75, for example. The hydrogen can be recovered from the fractionating system and recycled by suitable lines and compressors not shown.

Suitable catalysts for the dehydrogenation are oxides of chromium, molybdenum, and/or vanadium supported on alumina. The catalyst concentration in the reactor ordinarily is of the order of between 10 and 15 pounds per cubic foot. A space velocity of 0.04 to 10 volumes of oil per hour per volume of catalyst within the reactor at any instant (measured at rest in compacted condition regardless of degree of dispersion in use) and a catalyst residence time of 1 minute to 360 minutes can be used. One to sixteen mols of hydrogen per mol of feed and a hydrogen partial pressure of 30 to 450 pounds per square inch are employed. An example of the operating conditions with one of the above catalysts is a space velocity of 0.6, a catalyst residence time of 60 minutes, a pressure of 200 pounds hydrogen partial pressure and a mol of hydrogen to mols of feed ratio of 2.

My invention is illustrated by drawings which form a part of this specification and which show diagrammatically an apparatus for carrying out the process. Referring to Figure 1 of the drawing, the feed stock is introduced through line 10 by pump 11 to pipe still 12 wherein the oil is vaporized and heated. Part or all of the fresh feed can be passed by line 13 in heat exchange with the hot regenerated catalyst in "catastat" 14.

As the heated vapor passes through transfer line 15 it picks up powdered catalyst from standpipe or "catastat" 16. The catalyst is introduced into the transfer line in amounts regulated by slide valve or star feeder 17. It should be understood, of course, that steam or a mechanical screw or any other suitable means can be used for introducing the catalyst into transfer line 15 and that the catalyst is carried by the vapors in this line to upflow reactor 18. If desired, the catalyst can be injected directly into the reactor instead of being introduced into the transfer line 15.

Reactor 18 can be a cylindrical vessel with a conical inlet and outlet respectively and of such size and cross-sectional area as to retain the necessary amount of catalyst for effecting the desired amount of conversion. The cross-sectional area should be such as to insure a vertical vapor velocity of between about .3 and 3 feet per second in the reactor if the reaction is to be effected under the desired "fluid phase" conditions. It should be understood, however, that my invention is not limited to any particular reactor size and shape and that it is only necessary to provide a contact of the vapors with a sufficient amount of catalyst to effect the desired conversion.

Vapors together with suspended catalyst leave the top of reactor 18 through line 19 and are conducted to cyclone separator 20. The catalyst separated from vapors in separator 20 falls into hopper or stripper 21 which in turn discharges the catalyst into standpipe or catastat 22. This standpipe is aerated by means of an inert gas such as steam introduced through line 23 and additional gas can be introduced through line 24 for maintaining desired aeration or stripping in stripper 21. Gases from stripper 21 are vented through line 25 to line 26 which is the line conveying reaction vapors from separator 20 to further catalyst separators (not shown) if required and thence to bubble tower 27.

Gasoline and gases are taken overhead from tower 27 through line 28 and cooler 29 to reflux drum 30. Gas can be vented from this receiver through line 31. A portion of the liquids can be recycled by valved line 32 and pump 33 as reflux in tower 27. The balance of the liquid is conducted by valved line 34 to stabilizer 35.

Gas oil from bubble tower 27 is withdrawn by valved line 36 and all or a portion recycled. For example, the gas oil can be subjected to solvent extraction and the raffinate recycled with fresh feed.

Stabilizer 35 is operated at an elevated pressure in the conventional manner. Reflux, pressure, and reboiling are controlled to take stabilized gasoline off the base of tower 35 through valved line 37 for further treatment, storage, or use.

Gases eliminated in producing stabilized gasoline pass overhead from stabilizer 35 to condenser 38 by line 39 and thence to reflux drum 40 from which gases can be vented through line 41. The condensate is removed from the base of reflux drum 40 by means of valved line 42 and pump 43. A portion of it is returned to stabilizer 35 as reflux through valved line 44 and the rest of the condensate is withdrawn from the system by valved line 45.

Spent catalyst from catastat 22 is introduced through valve or star feeder 46 by means of an oxygen-containing gas such as air from line 47 into line 48 and conveyed therein to upflow regenerator 49. The regenerator can be a cylindrical vessel similar in size and shape to reactor 18 since I prefer to burn the carbonaceous deposit from the catalyst while the catalyst is in the suspended dense phase condition that is obtainable with the use of vertical vapor velocities of about 1 or 2 feet per second.

When the regeneration is carried out under proper conditions and excessive temperatures are avoided the catalyst can be recycled in the system almost indefinitely. The temperatures employed in regeneration ordinarily are about 1000° F. to 1200° F., for example, below about 1050° F. Higher temperatures can be used with certain oxide catalysts whereas lower temperatures are sometimes required with activated natural clays, magnesia and the like.

The regeneration is highly exothermic and the temperature tends to rise to levels injurious to the activity of the catalyst. Regeneration temperatures, however, can be held within close limits by recycling cool regenerated catalyst from standpipe 14. Cool catalyst from catastat 14 can be introduced through valve or star feeder 50 by means of an oxygen-containing gas such as air from line 51 into line 48 and passed in controlled amounts to upflow regenerator 49 with spent catalyst from catastat 22.

Regenerated catalyst is carried out of the top of regenerator 49 through line 52 to cyclone separator 53. The regeneration gases and catalyst separated from some of the catalyst in separator 53 are withdrawn through line 54 to separator 55. The regeneration gases separated from the catalyst in separator 55 are withdrawn through line 56, and both heat and catalyst can be recovered therefrom in any conventional manner. If desired the separators 53 and 55 can be combined and the separated catalyst stream divided between catastats 14 and 16.

Catalyst from separator 53 falls to stripper 57 and thence to standpipe or catastat 14. Aerating gas is introduced through lines 58 and 59 and such gas is preferably withdrawn from the top of stripper 57 through line 60 and conducted to line 54. Likewise catalyst recovered in separator 55 falls to hopper 61 and thence to standpipe 16. Aerating gas is introduced through lines 62 and 63 and the gases vented from the top of hopper 61 and separator 55 through lines 64 and 56 respectively.

Figures 2, 3, 4:
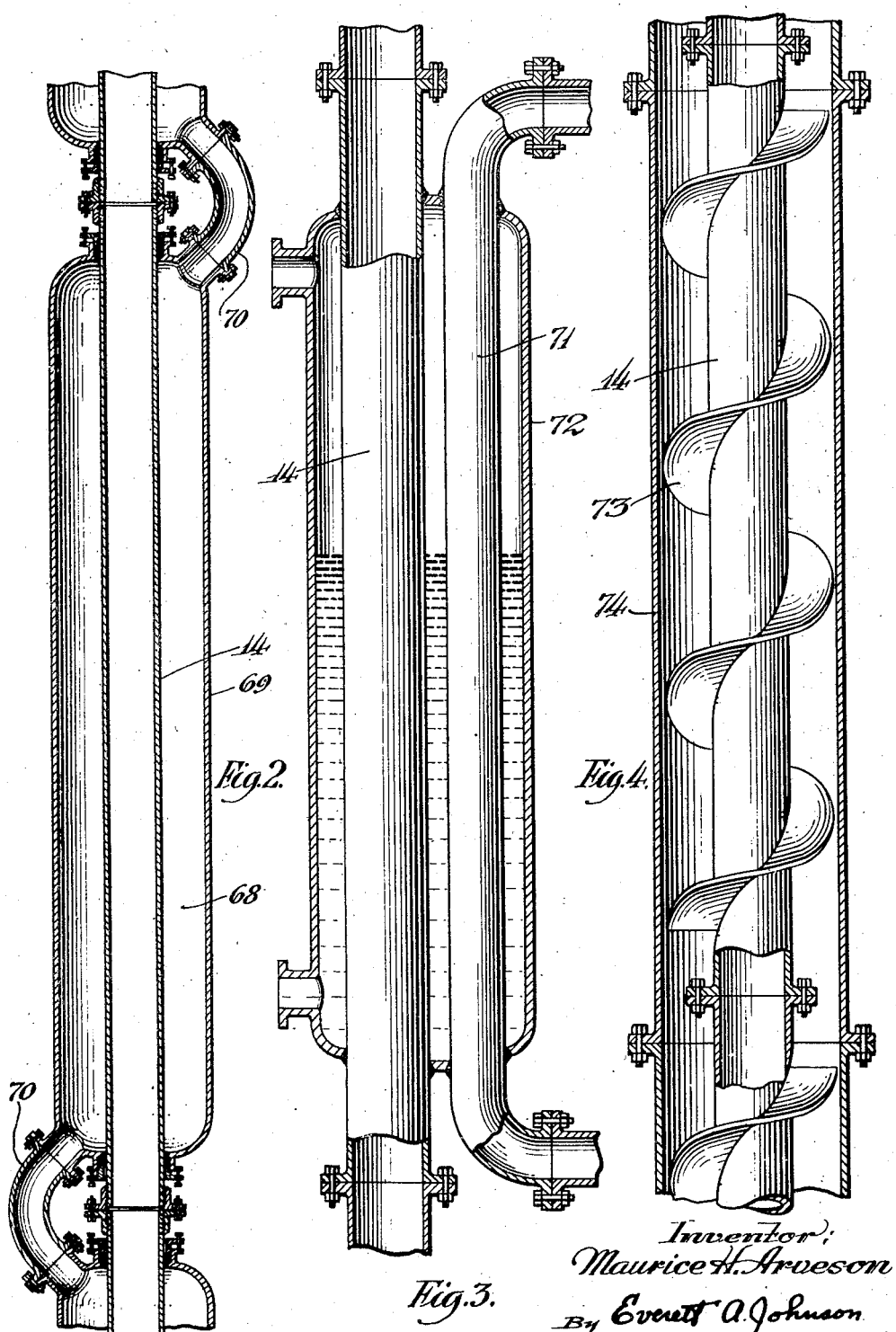

Reverting to standpipe 14, it is provided with cooler designated generally by the numeral 65 which for example can take the form illustrated in Figures 2, 3 and 4. As to the material to be used to furnish cooling, the preferred material is fresh feed to the unit which can be passed countercurrent to the descending hot aerated catalyst. Thus the fresh feed is preheated very close to reaction temperature. When the reaction temperature is attained the furnace 12 can be used only to start up the unit. The fresh feed enters the cooler 65 by valved line 13, leaves the exchanger by line 66, and passes by either of valved lines 10 and 67 to furnace 12 or transfer line 15, respectively. Alternatively, water can be introduced to cooler 65 and converted into steam; steam can be introduced and superheated, or molten salt can be introduced and the heat taken up by the molten salt used in turn to generate steam. Also the fresh feed and hot catalyst can be heat exchanged indirectly by molten salt wherein the level of molten salt determines the extent of heat exchange within a given section. Such an apparatus is illustrated in Figure 3.

Referring to Figure 2, the standpipe 14 can be a central tube and the cooling of the standpipe effected by a liquid being passed through the annulus 68 between the standpipe 14 and the shell 69, the flow being countercurrent. It is preferred that the cooler comprises units of dual tube, single pass heat exchangers, in series or parallel with by-passing of a given unit possible. Conventional means such as elbows 70 can be used to connect the units.

The modification of my cooler illustrated in Figure 3 comprises one or more pipes 14 for the downward flow of catalyst and one or more pipes 71 for the upward flow of the cooling material are encased in a single shell 72. The shell 72 can be filled with a solid or liquid heat-transferring medium, for example, solid aluminum, which can be melted and removed for repair purposes or to regulate the extent of heat transfer. Molten salt, lead or other liquid medium can be used whereby the level can be adjusted to adjust the extent of heat transfer.

The annulus about the standpipe 14 in Figure 4 can contain helical fins 73 to impart a spiral motion to the upflowing oil or other heat exchange medium within shell 74 whereby an effective heat exchange is attained.

Various other modifications of the invention will be apparent to those skilled in the art from the above description and I do not limit myself to any of the details hereinabove set forth except as defined by the following claims.

I claim:

1. In apparatus for the regeneration of catalyst, the combination of an elongated contacting chamber of substantial cross-sectional area, inlet means at a low point in said contacting chamber, an outlet for the elongated chamber communicating with a catalyst-separating means, a standpipe outside said contacting chamber, a conduit from said separating means to the top of said standpipe, valve means for withdrawing catalyst from the bottom of said standpipe, a shell around at least a portion of the length of said standpipe, inlet means for supplying a heat transfer medium to said shell, an outlet means for withdrawing heat transfer medium from said shell, and a regeneration gas line extending between the bottom of said standpipe and said contacting chamber and adapted to transfer catalyst from said standpipe to said chamber.

2. In a catalytic conversion process wherein catalyst is regenerated while suspended in regeneration gas in a regeneration zone and wherein critical regeneration gas velocities are required for maintaining said suspended catalyst in dense phase condition, the method of operation which comprises separating hot regenerated catalyst from regeneration gas, accumulating at least a portion of the separated catalyst at the top of a dense column of aerated regenerated catalyst, surrounding said regenerated catalyst column with a heat exchange fluid whereby the catalyst is cooled as it moves downwardly in said column, maintaining the column at such height and at such density that the pseudo-hydrostatic pressure at its base exceeds the pressure of a regeneration gas stream communicating with the base of said column and entering the base of said regeneration zone, dispersing cooled regenerated catalyst from the base of the column into said stream and carrying said dispersed catalyst by said stream back to said regeneration zone, the dispersion of the catalyst in the stream and its return to the regeneration zone being effected by utilizing the pseudo hydrostatic pressure exerted by said dense column of aerated regenerated catalyst.

3. The process of claim 2 wherein the heat exchange fluid comprises at least a part of the charging stock to said catalytic conversion process.

MAURICE H. ARVESON.

REFERENCES CITED

The following references are of record in the file of this patent:

UNITED STATES PATENTS

| Number | Name | Date |
|---|---|---|
| 2,320,273 | Gohr et al. | May 25, 1943 |
| 2,264,438 | Gaylor | Dec. 2, 1941 |
| 2,253,486 | Belchetz | Aug. 19, 1941 |
| 2,209,346 | McCausland | July 30, 1940 |
| 2,283,832 | Thomas | May 19, 1942 |
| 1,123,201 | Almirall | Dec. 29, 1914 |
| 2,060,936 | Haag, Jr. | Nov. 17, 1936 |
| 2,311,564 | Munday | Feb. 16, 1943 |
| 2,326,705 | Thiele et al. | Aug. 10, 1943 |
| 2,349,574 | Conn | May 23, 1944 |
| 2,296,722 | Marancik et al. | Sept. 22, 1942 |